United States Patent
Hayashi et al.

(10) Patent No.: US 7,712,500 B2
(45) Date of Patent: May 11, 2010

(54) PNEUMATIC TIRE WITH CUSHION RUBBER AND METHOD FOR PRODUCING THE SAME

(75) Inventors: Norio Hayashi, Kobe (JP); Masanori Takahashi, Kobe (JP); Kiyoto Maruoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 718 days.

(21) Appl. No.: 11/594,129

(22) Filed: Nov. 8, 2006

(65) Prior Publication Data
US 2007/0102088 A1     May 10, 2007

(30) Foreign Application Priority Data
Nov. 9, 2005    (JP)    ............. 2005-325137

(51) Int. Cl.
*B60C 9/18*    (2006.01)
*B29D 30/06*    (2006.01)
(52) U.S. Cl. .............. 152/532; 156/117; 156/130; 156/130.7
(58) Field of Classification Search ........... 152/532; 156/117, 130, 130.7
See application file for complete search history.

(56) References Cited
U.S. PATENT DOCUMENTS

2002/0088529 A1 * 7/2002 Ogawa et al. ........ 156/130.7 X
2005/0173041 A1 * 8/2005 Miki ................ 156/130.7 X
2006/0090836 A1 * 5/2006 Caretta et al. ............ 156/117

FOREIGN PATENT DOCUMENTS

| JP | 2000025413 A | * | 1/2000 |
| JP | 2002-160508 A | | 6/2002 |
| JP | 2003335110 A | * | 11/2003 |
| JP | 2000-094542 A | | 4/2004 |
| JP | 2005212742 A | * | 8/2005 |
| WO | WO-03/101712 A1 | * | 12/2003 |

* cited by examiner

*Primary Examiner*—Adrienne C Johnstone
(74) *Attorney, Agent, or Firm*—Birch, Stewart, Kolasch & Birch, LLP

(57) ABSTRACT

A pneumatic tire 1 having improved uniformity and durability and including a toroidal carcass 6 extending from a tread portion 2 to each of bead cores 5 in bead portions 4 through sidewall portions 3, a belt layer 7 disposed radially outward of the carcass 6 in the tread portion 2, and a cushion rubber 9 having an approximately triangular cross section disposed between the carcass 6 and each of axial edge portions 7E of the belt layer 7, and a method for producing the same, wherein the cushion rubber 9 is made from a strip laminated body formed by circumferentially and spirally winding a first ribbon-like unvulcanized rubber strip and a second ribbon-like unvulcanized rubber strip having a different composition from that of the first rubber strip.

5 Claims, 8 Drawing Sheets

1

PNEUMATIC TIRE WITH CUSHION RUBBER AND METHOD FOR PRODUCING THE SAME

BACKGROUND OF THE INVENTION

The present invention relates to a pneumatic tire having an improved durability, a method for producing the same, and a cushion rubber suitable for use in the pneumatic tire.

Pneumatic tires are generally provided with cushion rubbers between a carcass and each of axial edge portions of a belt layer, as disclosed in JP-A-2002-160508 and JP-B-3370282. The cushion rubbers have an adequate flexibility and serve to ease a strain in the vicinity of the axially edge portions of the belt layer which are largely deformed at the time of running under load.

In general, a cushion rubber has been formed by continuously extruding a rubber compound into a ribbon-like cushion rubber "b" having an approximately triangular cross section, as shown in FIG. 9(A), from a die of an extruder, cutting the extruded cushion rubber "b" to a length corresponding the circumferential length of a tire and, as shown in FIG. 9(C), annularly winding the cut cushion rubber "b" on the outer surface of a carcass ply (not shown) wound around a cylindrical forming drum D. FIG. 9(B) shows a side view of the cut cushion rubber "b" whose both ends b1 and b2 in the circumferential direction of a tire are diagonally cut in the same direction into a tapered form.

The tapered both ends b1 and b2 are jointed so that the thickness t1 of a joint portion J becomes identical with the thickness t2 of the remaining portion, but it is not easy to form a joint portion J having exactly the same thickness as that of the remaining portion. Thus, such a joint portion J having a different thickness may deteriorate the uniformity of a tire. Further, in case of heavy duty tires used for trucks and buses, since the tires are used under conditions of high load and high inner pressure, a strain is easy to concentrate particularly at the joint portion J having a different thickness of the cushion rubber. Therefore, such a joint portion J may cause deterioration of the durability of tires.

It is an object of the present invention to provide a pneumatic tire having no disadvantages caused by joint portion of the cushion rubber.

A further object of the present invention is to provide a pneumatic tire having improved uniformity and durability by forming a cushion rubber having no joint portion J.

Another object of the present invention is to provide a method for producing a pneumatic tire which can eliminate the disadvantages caused by joint portion of the cushion rubber.

These and other objects of the present invention will become apparent from the description hereinafter.

SUMMARY OF THE INVENTION

It has now been found that a cushion rubber formed in such a manner as winding an extrudate around a drum may cause deterioration of uniformity and durability of pneumatic tires for the reasons as mentioned above, and that the uniformity and durability of pneumatic tires can be improved by producing a cushion rubber from a strip laminated body formed by spirally winding a first long ribbon-like unvulcanized rubber strip and a second long ribbon-like unvulcanized rubber strip having a different composition from that of the first rubber strip in the circumferential direction of tire.

In accordance with the present invention, there is provided a pneumatic tire including a toroidal carcass extending from a tread portion to each of bead cores in bead portions through sidewall portions, a belt layer disposed radially outward of the carcass in the tread portion, and a cushion rubber having an approximately triangular cross section disposed between the carcass and each of axial edge portions of the belt layer, wherein the cushion rubber is made from a strip laminated body formed by spirally winding a first ribbon-like unvulcanized rubber strip and a second ribbon-like unvulcanized rubber strip having a different composition from that of the first rubber strip in the circumferential direction of the tire.

Preferably, the cushion rubber includes a main body made from the first rubber strip and an inner layer portion made from the second rubber strip which is disposed radially inward of the main body and is contiguous to the carcass, wherein each of the first and second rubber strips are spirally wound in the direction from the axially inner side toward the axially outer side.

It is also preferable that the main body of the cushion rubber has a complex elastic modulus $E^*1$ of 2.0 to 5.0 MPa and a loss tangent (tan δ) of 0.03 to 0.07, and that the inner layer portion of the cushion rubber has a thickness of 0.2 to 3.0 mm, a complex elastic modulus $E^*2$ of 2.5 to 9.0 MPa which is larger than the complex elastic modulus $E^*1$ of the main body, and a sulfur content of at least 1.0 phr.

The present invention also provides a method for producing a pneumatic tire including a toroidal carcass extending from a tread portion to each of bead cores in bead portions through sidewall portions, a belt layer disposed radially outward of the carcass in the tread portion, and a cushion rubber having an approximately triangular cross section disposed between the carcass and each of axial edge portions of the belt layer, the method comprising a step of forming a raw cushion rubber by spirally winding at least two kinds of ribbon-like unvulcanized rubber strips having a different composition from each other in the circumferential direction of the tire.

Other components of the tire, e.g., belt layer and sidewall, can be formed in a known manner. After producing a green tire, it is vulcanized in a known manner to give a pneumatic tire.

Since the cushion rubber in the pneumatic tires of the present invention is formed from a strip laminated body formed by circumferentially and spirally winding at least two kinds of unvulcanized rubber strips, it has no joint portion as conventionally formed when the cushion rubber is formed from an extrudate having an approximately triangular cross section. Therefore, the cushion rubber has a circumferentially uniform thickness, and the uniformity and durability of tire can be improved. Further, since the cushion rubber is formed using at least two kinds of rubber strips having different compositions, various desired performances can be imparted to the cushion rubber or the above-mentioned effects can be further enhanced.

The term "complex elastic modulus" and the term "loss tangent (tan δ)" as used herein denote values measured by a viscoelasticity spectrometer under the conditions of measuring temperature 70° C., frequency 10 Hz, initial elongational strain 10% and amplitude (zero to peak) 1%. Specimens for the measurement are prepared, for example, by dismantling a tire, cutting a specimen having a width of 4 mm, a length of 30 mm and a thickness of 1 mm out of a desired portion of the tire, and buffing the specimen to smoothen the uneven surface thereof.

DETAILED DESCRIPTION OF THE INVENTION

An embodiment of the present invention will now be explained with reference to the accompanying drawings.

Figure 1:
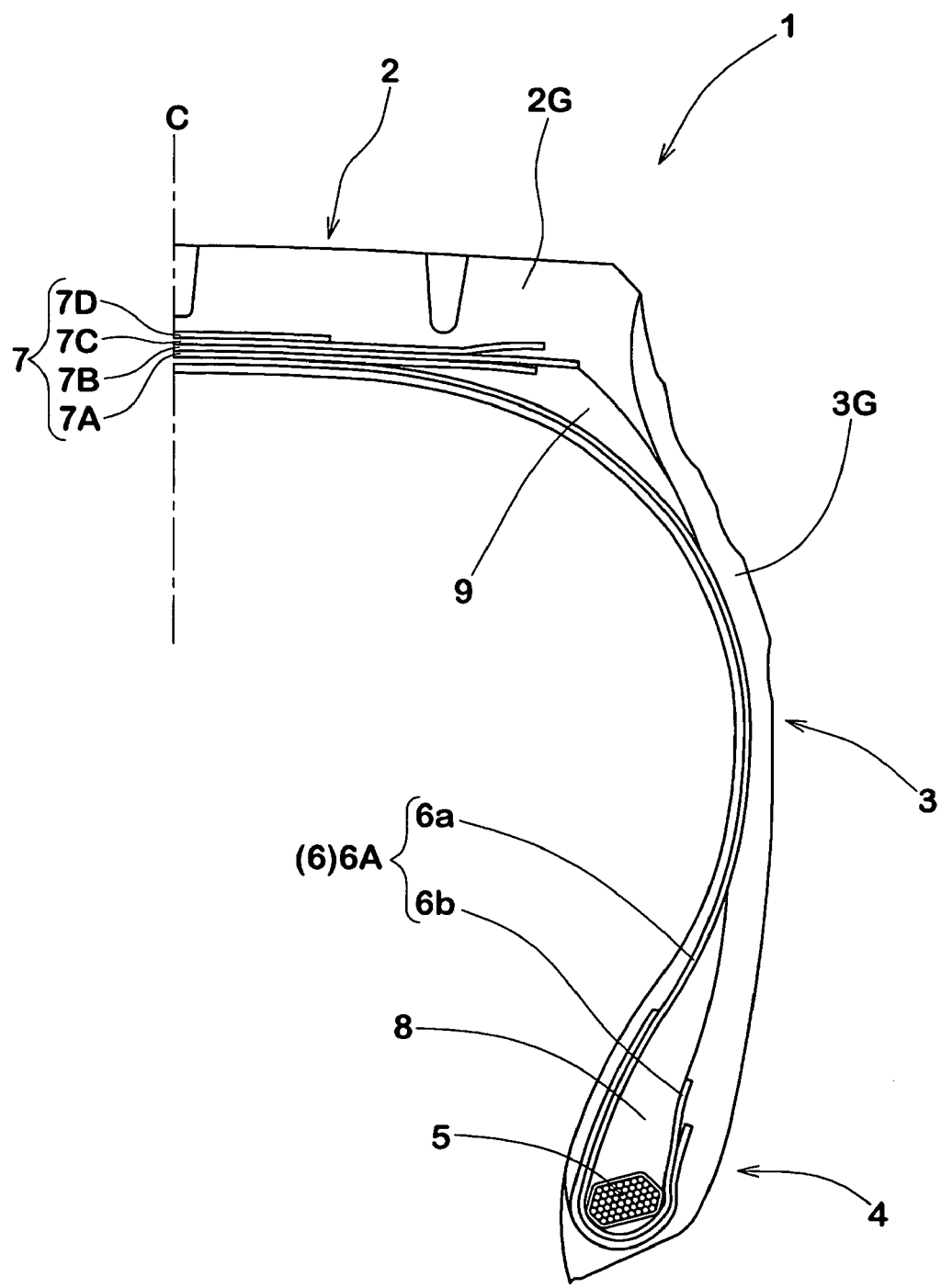
FIG. 1 is a cross sectional view of a heavy duty pneumatic tire illustrating an embodiment of the present invention.
Figure 2:
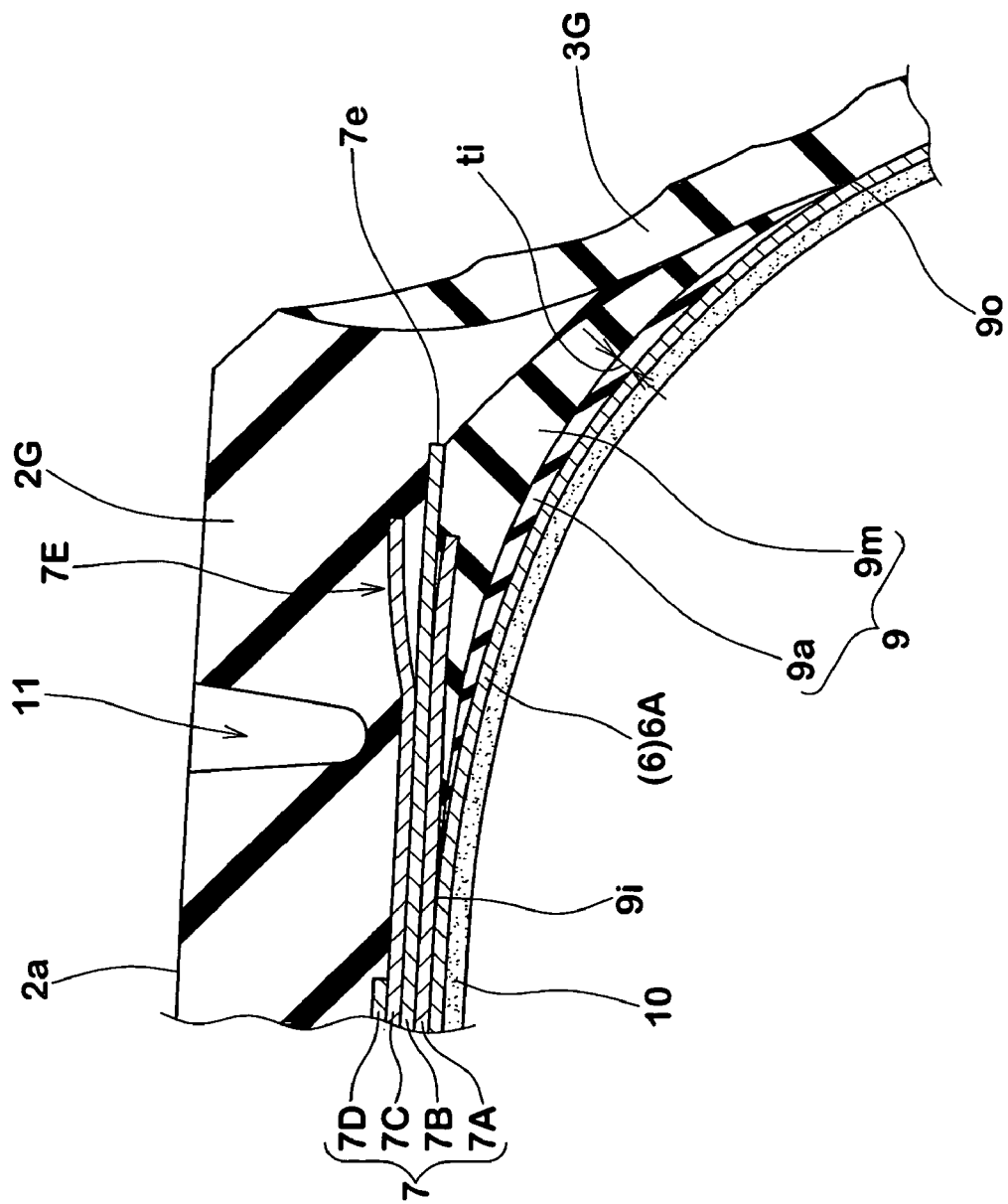
FIG. 2 is a partial cross sectional view illustrating a part of a tread portion of the tire shown in FIG. 1 in an enlarged form.

FIG. 1 shows, as en embodiment of the present invention, a cross sectional view of a right half of a heavy duty pneumatic tire used for trucks, buses and so on, and FIG. 2 shows an enlarged view of a main part thereof. In FIGS. 1 and 2, heavy duty pneumatic tire 1 includes a tread portion 2, a pair of sidewall portions 3 extending radially inwardly from the both axial edges of the tread portion 2, and a pair of bead portions 4 located at radially inner ends of the sidewall portions 3. The pneumatic tire 1 is provided with a toroidal carcass 6 extending between a pair of the bead portions 4, 4, and a belt layer 7 disposed radially outward of the carcass 6 in the tread portion 2.

The carcass 6 comprises at least one carcass ply 6A of steel cords and/or organic fiber cords (in the embodiment as shown in FIGS. 1 and 2, a single carcass ply in which steel cords are disposed at an angle of 80 to 90° with respect to the tire equator C. The carcass ply 6A is composed of a main body portion 6a that extends from tread portion 2 to each of bead cores 5 in bead portions 4 through sidewall portions 3, and turnup portions 6b that are continuous with the main body portion 6a and are turned up around the bead cores 5 (in this embodiment, from the axially inside to the axially outside of the tire) to thereby anchor the carcass ply.

As occasion demands, bead apex rubber 8 is disposed radially outward of each bead core 5 and between main body portion 6a and turnup portion 6b of the carcass ply to radially outwardly extend from the bead core 5 in a tapered manner, thereby reinforcing the bead portion 4.

Further, an air-impermeable inner liner 10 may be disposed on the inner surface of the carcass 6 to provide pneumatic tires 1 of tubeless type.

The belt layer 7 comprises at least two plies, usually three or four plies, of steel cords which are aligned in parallel to each other and oriented diagonally with respect to the tire equator C. The tire 1 according to the embodiment shown in FIGS. 1 and 2 includes a belt layer 7 composed of four belt plies 7A to 7D. At least two belt plies have steel cords arranged at an angle of about 15° to about 40° with respect to the tire equator C, and are stacked so that the belt cords in one ply crosses the cords in the other belt ply.

A tread rubber 2G is disposed radially outward of the belt layer 7. The tread rubber 2G has a tread surface 2a which contacts a road, and is provided in the tread surface 2a with at least one circumferential main groove 11 which continuously extends in the circumferential direction.

The pneumatic tire 1 in this embodiment has a so-called SOT (Sidewall Over Tread) structure in which the both axial edges of the tread rubber 2G are covered with a sidewall rubber 3G. However, the tires of the present invention are not limited to such a structure.

A cushion rubber 9 having an approximately triangular cross section is disposed between the carcass 6 and each of axial edge portions 7E of the belt layer 7. The cushion rubber 9 has an axially inner edge 9i and an axially outer edge 9o and extends between them to form an approximately triangular cross section. The axially outer edge 9o is located axially outward of a belt edge 7e which is an axially outermost edge of belt plies, in other words, an axial edge of the widest belt ply among the belt plies 7A to 7D. The axially inner edge 9i is located axially inward of the belt edge 7e. In this embodiment shown in FIG. 2, the axially inner edge 9i is located axially inward of an axially outermost circumferential main groove 11 (shoulder groove). Further, the cushion rubber in this embodiment has a thickness that gradually increases from the axially inner edge 9i to the belt edge 7e and decreases from the belt edge 7e to the axially outer edge 9o. In other words, the cushion rubber 9 has the maximum thickness at a location corresponding to the belt edge 7e, and from that location, extends along the radially outer surface of the carcass 6 with gradually decreasing its thickness. Thus, the cushion rubber 9 is formed into a triangular shape in cross section that the axially outer surface is convexly curved.

Since the cushion rubber 9 is disposed to fill a region between the carcass 6 and the axially edge portion 7E of belt layer 7, it follows a deformation of the edge portion 7E of belt layer 7 in load running and serves to disperse a strain. Further, excess heat generation caused by periodical deformation can be prevented by suitably controlling the composition of the cushion rubber 9. The cushion rubber 9 as shown in FIGS. 1 and 2 is also useful for easing a strain which is generated in the vicinity of the bottom of the main groove 11 disposed in the tread portion 2.

Preferably, the cushion rubber 9 for belt layer 7 is composed of a cushion main body 9m having an approximately triangular cross section and an inner layer portion 9a having tapered edge portions which is disposed radially inward of the main body 9m and is contiguous to the carcass 6.

Figure 3:
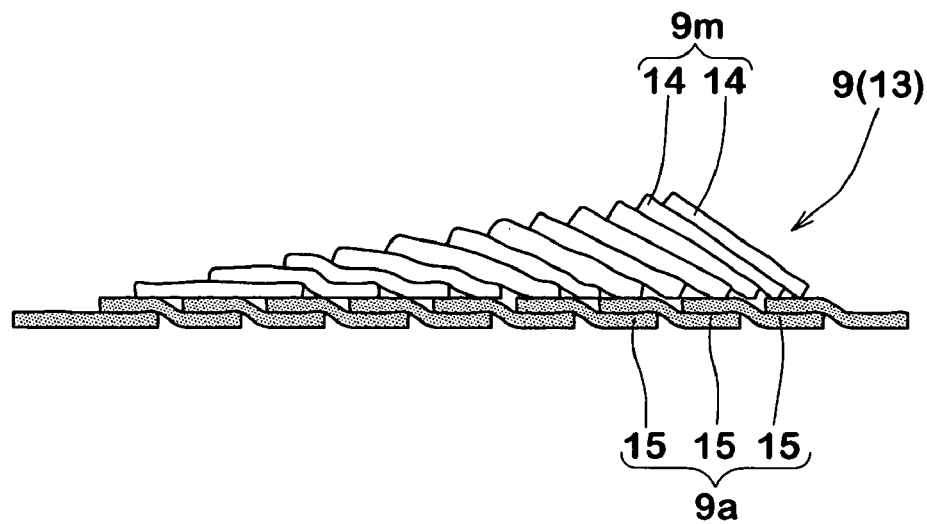
FIG. 3 is a schematic cross sectional view of an unvulcanized cushion rubber.

FIG. 3 shows a schematic cross sectional view of an unvulcanized cushion rubber 9. The unvulcanized cushion rubber 9 is in the form of a strip laminated body 13 prior to vulcanization of a green tire, and provides the cushion rubber 9 by the vulcanization. The strip laminated body 13 in this embodiment is formed by circumferentially and spirally winding a first long ribbon-like unvulcanized rubber strip 14 and a second long ribbon-like unvulcanized rubber strip 15 having a different composition from that of the first rubber strip 14.

In this embodiment, the cushion main body 9m is formed from the first rubber strip 14 and the inner layer portion 9a is formed from the second rubber strip 15. The main body 9m and the inner layer portion 9a after the vulcanization is shown in FIG. 2.

The cushion main body 9m constitutes a main portion of the cushion rubber 9, in other words, it occupies the largest area in cross section of vulcanized cushion rubber 9. The cushion main body 9m plays a main role of the cushion rubber 9, i.e., relaxation of strain and prevention of heat generation owing to deformation. For this purpose, it is preferable that the cushion main body 9m (in other words, the first rubber strip 14 is made of a rubber which has a complex elastic modulus $E^*1$ of 2.0 to 5.0 MPa and a loss tangent (tan $\delta$) of 0.03 to 0.07 after the vulcanization.

If the complex elastic modulus $E^*1$ of the cushion main body 9m is less than 2.0 MPa, the cushion rubber 9 has a tendency that the rigidity is too low to suppress deformation of the edge portion 7E of the belt layer 7, so the durability of tire is deteriorated. If the complex elastic modulus $E^*1$ is more than 5.0 MPa, there is a tendency that the rigidity of the cushion rubber 9 becomes too large, so a sufficient ability to ease a strain is not obtained. From such points of view, the complex elastic modulus $E^*1$ of the cushion main body 9m is preferably 2.5 to 4.0 MPa.

If the loss tangent (tan δ) of the cushion main body 9m is less than 0.03, there is a tendency that the reinforcing proper is hard to be exhibited, so the durability is deteriorated. If the loss tangent (tan δ) of the cushion main body 9m is more than 0.07, there is a tendency that energy loss of the cushion rubber 9 in load running becomes large, so heat is easy to generate and accordingly the durability is deteriorated. From such points of view, the loss tangent (tan δ) of the cushion main body 9m is preferably from 0.04 to 0.06.

The inner layer portion 9a of the cushion rubber 9 serves to prevent the cushion rubber 9 from separating from the carcass 6, thereby securing the durability. For this purpose, in this embodiment shown in FIGS. 1 and 2, the inner layer portion 9a is disposed in substantially a full region of the radially inner surface of the cushion main body 9m. As shown in FIG. 2, the inner layer portion 9a is located between the cushion main body 9m and the carcass 6 after the vulcanization, so the main body 9m does not contact the carcass.

Such an inner layer portion 9a of the cushion rubber 9 is preferred to have a complex elastic modulus E*2 which is larger than the complex elastic modulus E*1 of the cushion main body 9m and falls within the range of 2.5 to 9.0 MPa, especially 3.0 to 7.0 MPa. If the complex elastic modulus E*2 of the inner layer portion 9a is the same as or smaller than the complex elastic modulus E*1 of the cushion main body 9m, there is a tendency that a large shear strain is easy to generate at the interface between the inner layer portion 9a and the carcass 6, so a sufficient adhesive force is not obtained. If the complex elastic modulus E*2 of the inner layer portion 9a is more than 9.0 MPa, the adhesive force to the carcass 6 is lowered. More preferably, the second rubber strip 15 for forming the inner layer portion 9a is prepared from a rubber compound having substantially the same composition as that of a topping rubber compound of the carcass ply 6A, whereby the adhesive strength between the inner layer portion 9a and the carcass 6 is further enhanced.

The maximum thickness "ti" of the inner layer portion 9a obtained after the vulcanization is preferably 0.2 to 3.0 mm, more preferably 0.5 to 2.5 mm. If the maximum thickness "ti" is less than 0.5 mm, there is a tendency that a sufficient effect of enhancing the adhesion property between the cushion rubber 9 and the carcass 6 is not obtained because the inner layer portion 9a is too thin. If the maximum thickness "ti" is more than 3.0 mm, the volume of the cushion main body 9m is decreased, so the performances to be exhibited by the cushion rubber 9 are lowered.

It is preferable that the inner layer portion 9a of the cushion rubber 9 is made of a rubber having a sulfur content of at least 1.0 phr. If the sulfur content of the inner layer portion 9a is less than 1.0 phr, a sufficient modulus of elasticity is not obtained and the inner layer portion 9a tends to become soft. If the sulfur content is too large, crosslinking of rubber is accelerated to lower the strength. Therefore, the sulfur content of the inner layer portion 9a is preferably from 1.0 to 4.0 phr, more preferably 1.5 to 3.0 phr. From the same viewpoints, it is preferable that the cushion main body 9m has a sulfur content of 1.5 to 3.0 phr.

Figure 4:
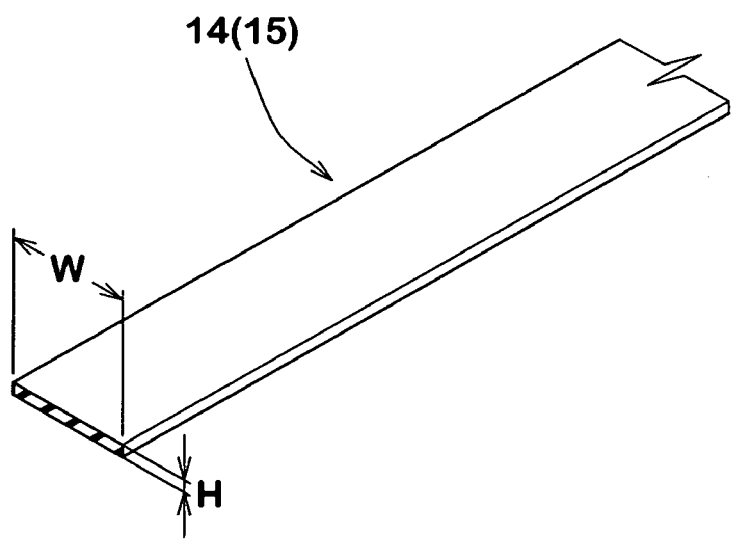
FIG. 4 is a perspective view of a rubber strip.
Figure 5A:
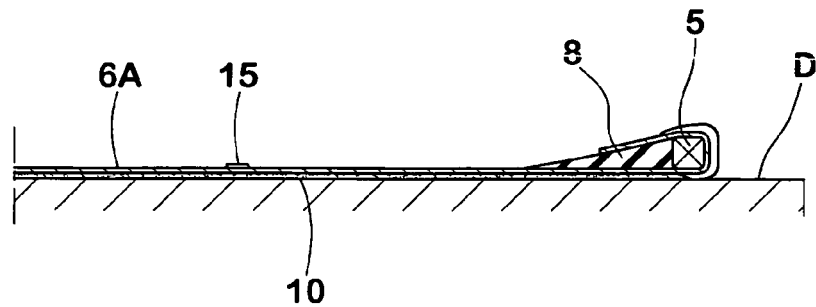
FIGS. 5(A) to 5(C) are schematic cross sectional views illustrating steps for producing a pneumatic tire.

The first and second rubber strips 14 and 15 used for forming the cushion rubber 9 are in the form of a ribbon having a rectangular cross section as shown in FIG. 4. They are continuously extruded in an unvulcanized state from an apparatus such as extruder or calender. The extruded rubber strip 14 and/or strip 15 are guided by conveyer-like applicators (not shown) and led to a cylindrical former D as shown in FIG. 5(A). On the former D are previously set a cylindrical inner liner 10 and a cylindrical carcass ply 6A, and the rubber strips 14 and 15 are directly wound around the outer surface of the carcass ply 6A to form a cushion rubber 9 in the form of a strip laminated body 13. The inner liner 10 is used in this embodiment, but the use thereof is optional.

Figure 5B:
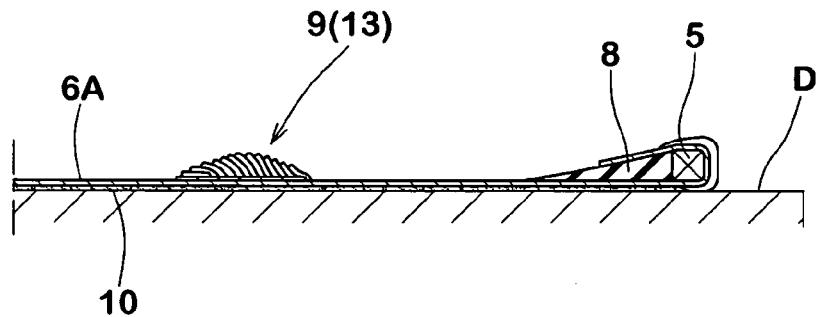
Figure 5C:
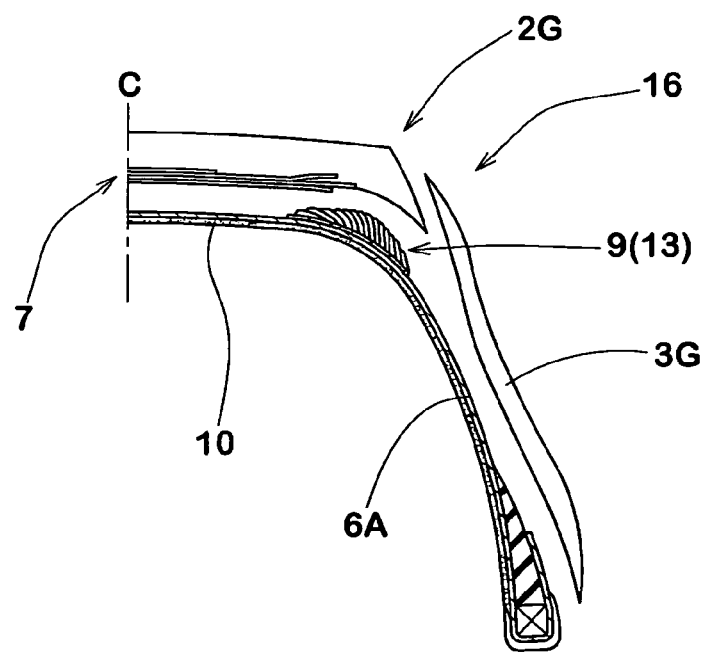

The winding of the rubber strips 14 and 15 is carried out in such a manner as firstly fixing the tip of the rubber strip 14 or 15 to a prescribed position on the carcass ply 6A by pressing the tip (FIG. 5(A)), and then rotating the former D while moving the rubber strip 14 or 15 in the axial direction of tire at a prescribed pitch, thereby spirally winding the rubber strip in the circumferential direction of the tire. Preferably, the rubber strip 14 or 15 is wound in an overlapping manner where at least the edge portions of the rubber strip overlap as shown in FIG. 3. Thus, a cushion rubber 9 in the form of a strip laminated body 13 is formed around the cylindrical carcass 6A as shown in FIG. 5(B). Bead cores 5 and bead apex rubbers 8 can be provided in a known manner. As shown in FIG. 5(C), after inflating the cylindrical carcass ply 6A into a toroidal form, other necessary tire components e.g., belt layer 7, tread rubber 2G and sidewall rubber 3G, are formed by a known technique to give a green tire 16. A pneumatic tire 1 is obtained by vulcanizing the green tire 16 in a mold.

Since the cushion rubber 9 made from the strip laminated body 13 does not have a joint portion J as formed when a cushion rubber 9 is formed in a conventional manner by jointing the both ends of an integrally extruded rubber, the cross section shape and thickness of the cushion rubber 9 are uniform in the circumferential direction. Therefore, the uniformity of tire is improved to provide a tire which has for example a good ride comfort with less vibration. Further, since stress concentration which is apt to generate at a thickness uneven portion of a cushion rubber is prevented, occurrence of damages at the edge portions 7E of the belt layer 7 is suppressed to improve the durability of tire.

The strip laminated body 13 can be formed by firstly winding a second rubber strip 15 to form the inner layer portion 9a of the cushion rubber 9 and then winding on the outer side of the inner layer portion 9a a first rubber strip 14 to form the cushion main body 9m. In that case, however, an idling time generates and it is industrially disadvantageous. Therefore, preferably the winding of the first rubber strip 14 is started during a period between after winding the second rubber strip 15 prescribed times and before the completion of the winding of the second rubber strip 15, as shown in FIGS. 6(A) to 6(D).

Figure 6A:
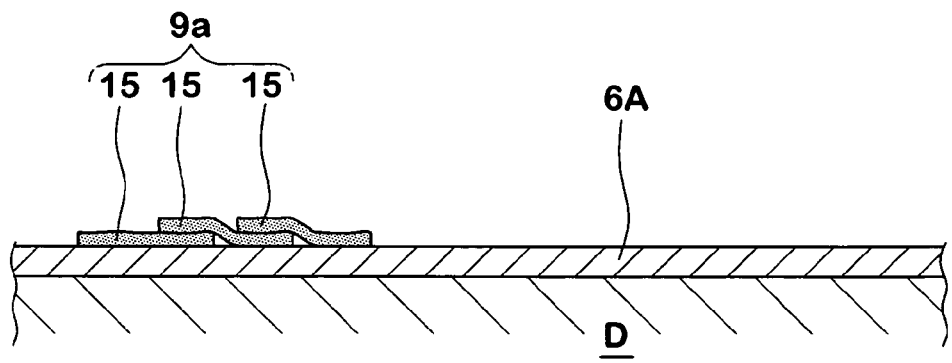
FIGS. 6(A) to 6(D) are schematic cross sectional views illustrating a step of winding a rubber strip.
Figure 6B:
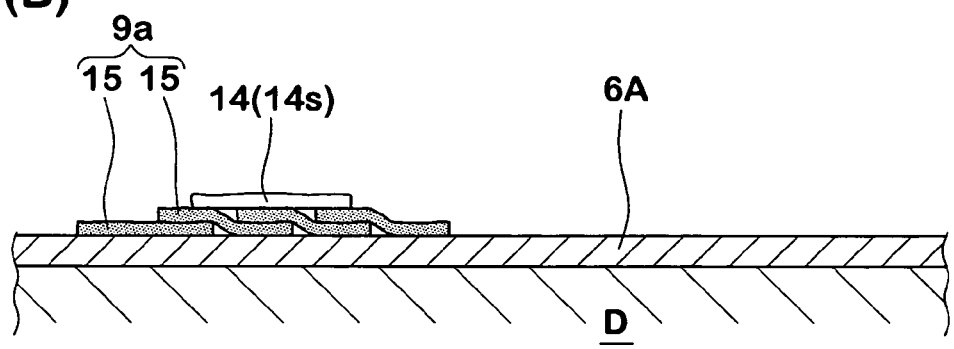
Figure 6C:
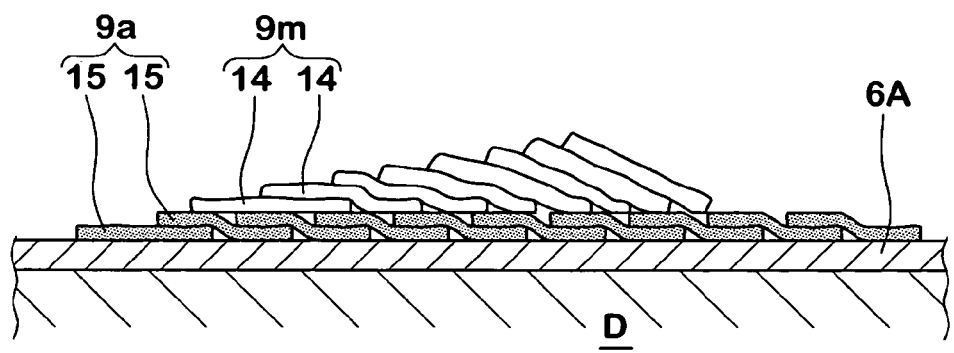
Figure 6D:
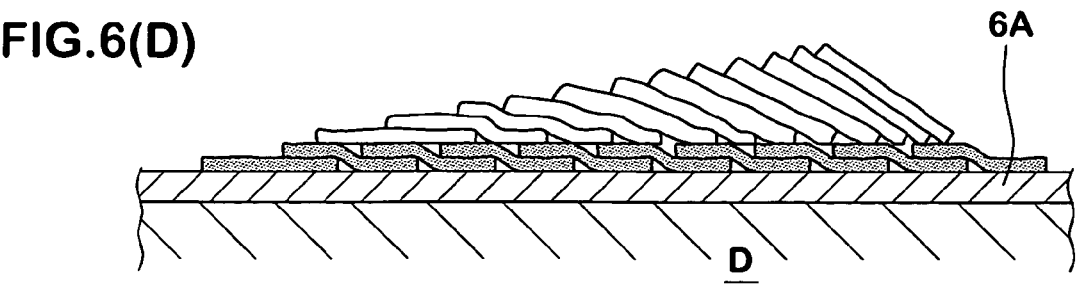

That is to say, as shown in FIG. 6(A), firstly a second rubber strip 15 is wound prescribed times on the outer surface of a carcass ply 6A wound around a cylindrical former D to form a small width inner layer portion 9a. The winding of the strip 15 is stopped and then, as shown in FIG. 6(B), a winding-starting end 14s is fixed onto the small width inner layer portion 9a. Then, the first and second rubber strips 14 and 15 are almost simultaneously wound in a spiral manner toward the axially outward of a tire. According to this winding manner, the idling time for winding the rubber strip 14 can be shortened to improve the productivity. The positions of applicators for guiding the rubber strips 14 and 15 can be suitably shifted in the circumferential direction so that they do not interfere with each other.

The cushion main body 9m and the inner layer portion 9a can be produced to have desired cross sectional shapes by suitably changing the spiral winding pitch (amount of shifting the strip in the axial direction) for each of the first and second rubber strips 14 and 15. In other words, the winding pitch for each rubber strip 14 or 15 is determined according to the desired cross sectional shape of each of the cushion main body 9m and the inner layer portion 9a, and it is programmed into an applicator controlling device or the like. The applicators exactly change the winding pitches of the rubber strips 14 and 15 based on signals of the device.

In the embodiment shown in the figures, the inner layer portion 9a is formed by shifting the second rubber strip 15 in the axial direction at substantially the same pitch during a period from starting the winding to finishing the winding, whereby an inner layer portion 9a having substantially uniform thickness can be formed. On the other hand, the cushion main body 9m is formed by gradually decreasing the winding pitch in the axial direction for the first rubber strip 14 during a period from starting the winding to finishing the winding, whereby the cushion main body 9m is formed to have an approximately triangular cross section having a thickness that gradually increases from the axially inner side toward the axially outer side.

Further, it is preferable to form the cushion main body 9m and the inner layer portion 9a by starting the spiral winding from the axially inner side and winding toward the axially outer side. Since the winding direction of a rubber strip in the main body and the inner layer portion formed in this manner is opposite to the direction that a shearing force acts on in running, cracking occurring along interfaces between overlapping rubber strips can be effectively prevented.

The width W and thickness H of each of the rubber strips 14 and 15 are not particularly limited, but it is preferable that the width W is from 5 to 30 mm and the thickness H is from 0.5 to 3.0 mm. If the width W is less than 5 mm or the thickness H is less than 0.5 mm, the number of windings of the rubber strips for forming a strip laminated body 13 increases, so the productivity tends to lower. If the width W is more than 30 mm or the thickness H is more than 3.0 mm, the length and width of overlapped portion increase and it tends to become difficult to form a desired cross section.

Figure 7:
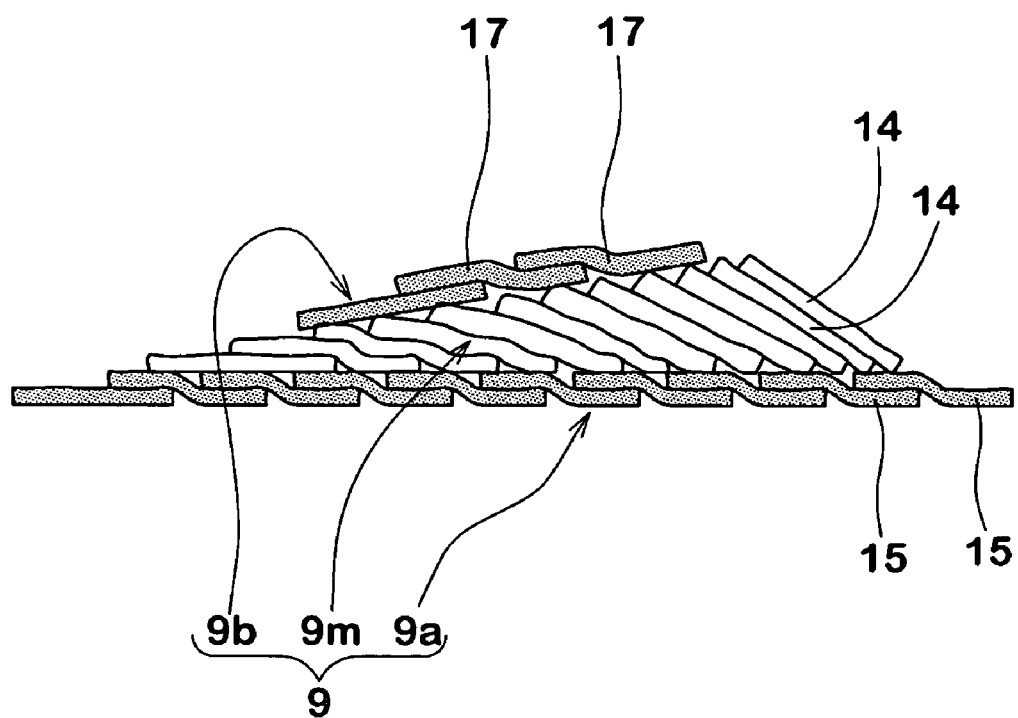
FIG. 7 is a schematic cross sectional view illustrating another embodiment of an unvulcanized cushion rubber.
Figure 8:
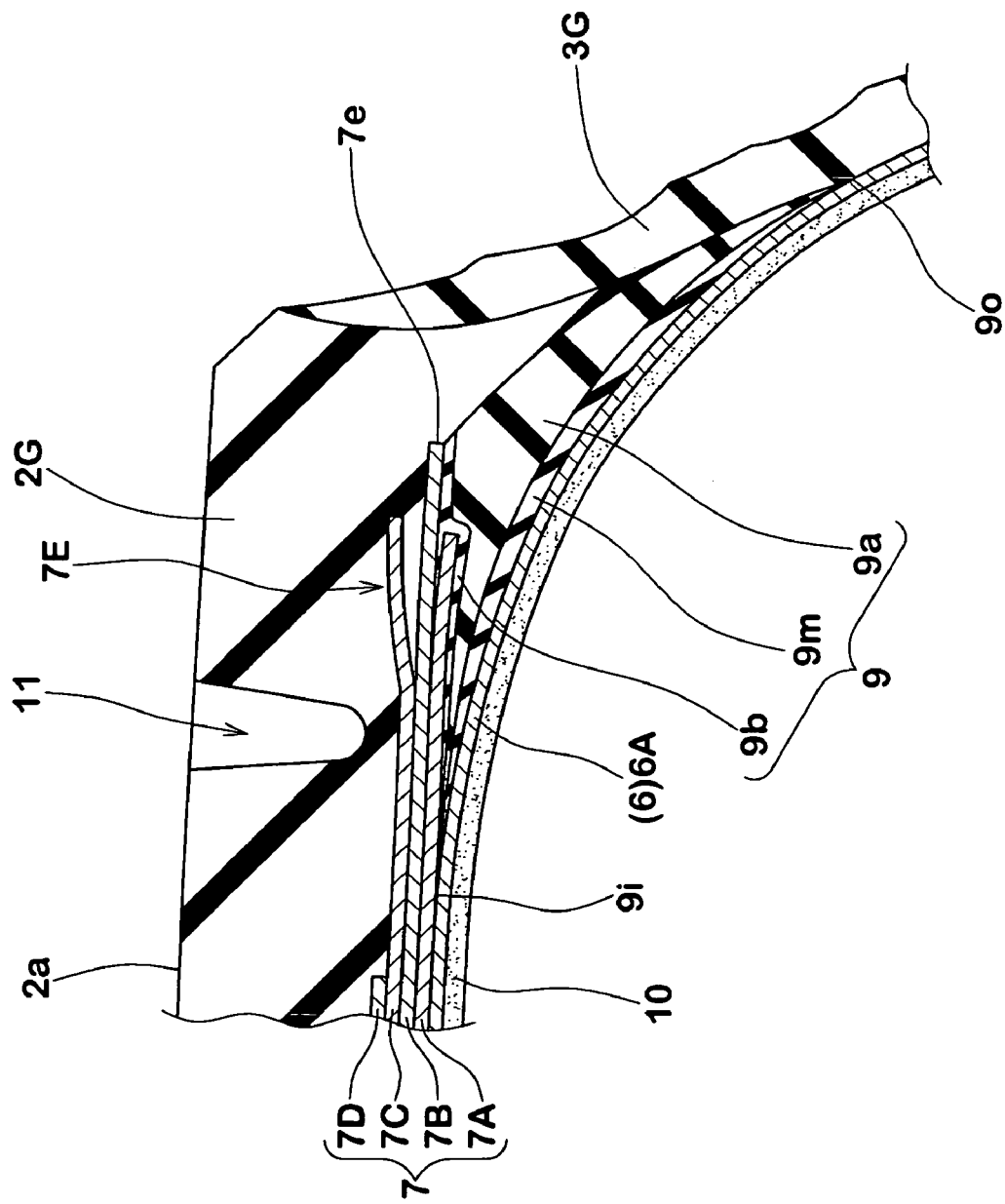
FIG. 8 is an enlarged partial cross sectional view illustrating a part of a tread portion of a pneumatic tire produced using the unvulcanized cushion rubber shown in FIG. 7.
Figure 9A:
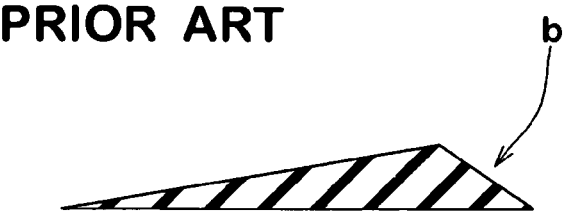
FIG. 9(A) is a cross sectional view of a conventional cushion rubber.
Figure 9B:
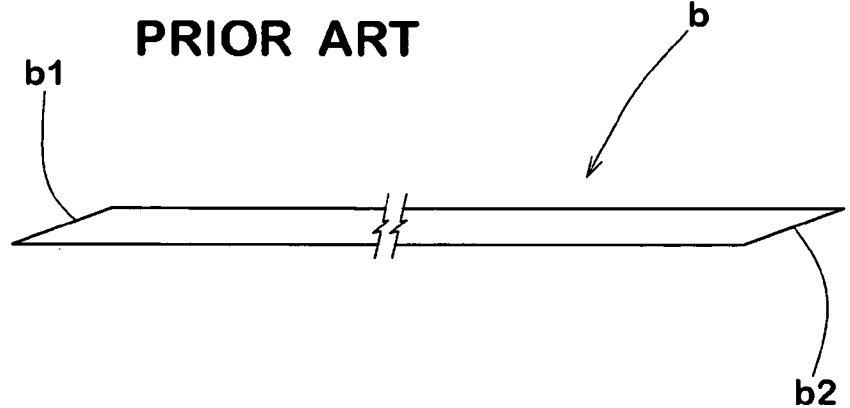
FIG. 9(B) is a side view thereof.
Figure 9C:
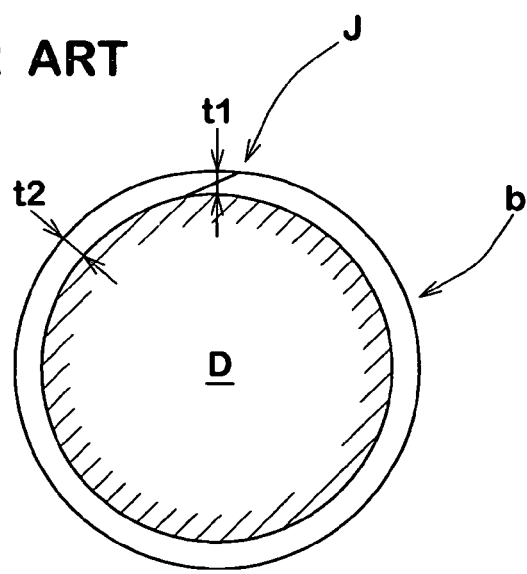
FIG. 9(C) is a schematic side view showing the state that the conventional cushion rubber is wound.

Another embodiment of an unvulcanized cushion rubber 9 is shown in FIG. 7. In FIG. 8 is shown a partial cross sectional view of a pneumatic tire (after vulcanization) obtained using the cushion rubber shown in FIG. 7. The cushion rubber 9 in this embodiment is composed of a cushion main body 9m, an inner layer portion 9a disposed radially inward of the main body 9m, and an outer layer portion 9b disposed radially outward of the main body 9m and in contact with the belt layer 7. The outer layer portion 9b is formed by spirally winding a third rubber strip 17 on the radially outer surface of the main body 9m. The rubber composition of the outer layer portion 9b (i.e., third rubber strip) is different from that of the main body 9m, and may be the same as or different from that of the inner layer portion 9a. It is preferable that the outer layer portion 9b has the same composition as that of a topping rubber of belt plies 7A and 7B which will contact with the outer layer portion 9b of cushion rubber 9 when a tire is produced, whereby the adhesion property of the cushion rubber 9 to the belt layer 7 is enhanced to improve the durability of tire.

The present invention is particularly suitable for a heavy duty pneumatic tire, but is also applicable to tires of other various categories.

While preferable embodiments of the present invention have been described with reference to the drawings, it goes without saying that the present invention is not limited to only such embodiments and various changes and modifications may be made.

The present invention is more specifically described and explained by means of the following examples and comparative examples. It is to be understood that the present invention is not limited to these examples.

EXAMPLES 1 TO 9 AND COMPARATIVE EXAMPLES 1 TO 3

Heavy duty pneumatic tires (size: 11R22.5) having the basic structure shown in FIG. 1 were manufactured based on the specifications shown in Table 1, and the durability and uniformity of each tire were evaluated by the following testing methods.

(1) Durability

After running a tire under the following conditions, it was dismantled and the state of a cushion rubber was visually observed.

Rim size: 7.5×22.5

Inner pressure: 700 kPa

Load: 40 kN (load of 1.5 times the standard maximum load)

Camber angle: 3°

Running speed: 20 km/h

Running distance: 300 km (2) Uniformity

With respect to a tire mounted on a rim (size: 7.5×22.5) and filled with air to an internal pressure of 700 kPa, the radial run-out (RRO) was measured using a uniformity testing machine. The smaller the value, the better the uniformity.

Test results are shown in Table 1.

It is observed in Table 1 that the tires of Examples according to the present invention has superior durability and uniformity as compared with tires of Comparative Examples.

TABLE 1

|  | Com. Ex. 1 | Com. Ex. 2 | Com. Ex. 3 | Ex. 1 | Ex. 2 | Ex. 3 |
| --- | --- | --- | --- | --- | --- | --- |
| Method of forming cushion rubber* | extrusion | extrusion | SW | SW | SW | SW |
| Structure of cushion rubber |  |  |  |  |  |  |
| Outer layer portion | none | none | none | none | none | none |
| Complex elastic modulus E * 3 (MPa) | — | — | — | — | — | — |
| tan δ | — | — | — | — | — | — |
| Maximum thickness (mm) | — | — | — | — | — | — |
| Cushion main body |  |  |  |  |  |  |
| Complex elastic modulus E * 1 (MPa) | 3.3 | 3.3 | 3.3 | 3.3 | 2.1 | 4.7 |
| tan δ | 0.05 | 0.05 | 0.05 | 0.05 | 0.03 | 0.06 |
| Maximum thickness (mm) | 10.0 | 10.0 | 10.0 | 10.0 | 10.0 | 10.0 |
| Inner layer portion |  |  |  |  |  |  |
| Complex elastic modulus E * 2 (MPa) | 7.0 | none | none | 7.0 | 7.0 | 7.0 |
| tan δ | 0.10 | — | — | 0.10 | 0.10 | 0.10 |
| Maximum thickness (mm) | 1.2 | — | — | 1.2 | 1.2 | 1.2 |
| Sulfur content (phr) | 3.1 | — | — | 3.1 | 3.1 | 3.1 |

TABLE 1-continued

| Test results | | | | | |
|---|---|---|---|---|---|
| Durability (damage of cushion rubber) | Peeling at one place | Peeling at interface with carcass | Peeling at interface with carcass | No damage | No damage | No damage |
| Uniformity (RRO) (mm) | 1.4 | 1.3 | 0.9 | 0.8 | 0.8 | 0.6 |

| | Ex. 4 | Ex. 5 | Ex. 6 | Ex. 7 | Ex. 8 | Ex. 9 |
|---|---|---|---|---|---|---|
| Method of forming cushion rubber* | SW | SW | SW | SW | SW | SW |
| Structure of cushion rubber | | | | | | |
| Outer layer portion | none | none | none | none | none | |
| Complex elastic modulus E*3 (MPa) | — | — | — | — | — | 5.2 |
| tan δ | — | — | — | — | — | 0.07 |
| Maximum thickness (mm) | — | — | — | — | — | 1.2 |
| Cushion main body | | | | | | |
| Complex elastic modulus E*1 (MPa) | 5.2 | 3.3 | 3.3 | 3.3 | 3.3 | 3.3 |
| tan δ | 0.07 | 0.05 | 0.05 | 0.05 | 0.05 | 0.05 |
| Maximum thickness (mm) | 10.0 | 10.0 | 10.0 | 10.0 | 10.0 | 10.0 |
| Inner layer portion | | | | | | |
| Complex elastic modulus E*2 (MPa) | 7.0 | 5.2 | 8.7 | 6.8 | 7.2 | 7.0 |
| tan δ | 0.10 | 0/07 | 0.11 | 0.10 | 0.10 | 0.10 |
| Maximum thickness (mm) | 1.2 | 1.2 | 1.2 | 1.2 | 1.2 | 1.2 |
| Sulfur content (phr) | 3.1 | 3.1 | 3.1 | 2.5 | 5.0 | 3.1 |
| Test results | | | | | | |
| Durability (damage of cushion rubber) | No damage | No damage | No damage | No damage | No damage | No damage |
| Uniformity (RRO) (mm) | 0.5 | 0.8 | 0.5 | 0.7 | 0.6 | 0.4 |

*SW: strip winding using rubber strip having width 20 mm and thickness 1.5 mm

What is claimed is:

1. A pneumatic tire comprising:
   a toroidal carcass extending from a tread portion to each of bead cores in bead portions through sidewall portions,
   a belt layer disposed radially outward of the carcass in the tread portion, and
   a cushion rubber having an approximately triangular cross section and disposed between the carcass and each of axial edge portions of the belt layer,
   wherein
   the cushion rubber is made from a strip laminated body formed by spirally winding a first ribbon-like unvulcanized rubber strip and a second ribbon-like unvulcanized rubber strip in the circumferential direction of the tire, the second ribbon-like unvulcanized rubber strip having a different composition from that of the first rubber strip,
   the cushion rubber includes
   a main body made from the first rubber strip and
   an inner layer portion made from the second rubber strip disposed radially inward of the main body and being contiguous to the carcass, and
   the inner layer portion is made of a rubber having a thickness of 0.2 to 3.0 mm, a complex elastic modulus E*2 of 2.5 to 9.0 MPa which is larger than the complex elastic modulus E*1 of the main body, and a sulfur content of at least 1.0 phr.

2. The pneumatic tire of claim 1, wherein
   the main body is made of a rubber having a complex elastic modulus E*1 of 2.0 to 5.0 MPa and a loss tangent (tan) of 0.03 to 0.07.

3. A method for producing a pneumatic tire comprising a toroidal carcass extending from a tread portion to each of bead cores in bead portions through sidewall portions,
   a belt layer disposed radially outward of the carcass in the tread portion, and
   a cushion rubber having an approximately triangular cross section and disposed between the carcass and each of axial edge portions of the belt layer, wherein the cushion rubber includes a main body and an inner layer portion disposed radially inward of the main body and is contiguous to the carcass,
   the method comprising
   a step of forming a raw cushion rubber by spirally winding at least two kinds of ribbon-like unvulcanized rubber strips having a different composition from each other in the circumferential direction of the tires wherein
   said main body is made from a first ribbon-like unvulcanized rubber strip and
   said inner layer portion is made from a second ribbon-like unvulcanized rubber strip, and
   the inner layer portion is made of a rubber having a thickness of 0.2 to 3.0 mm, a complex elastic modulus E*2 of 2.5 to 9.0 MPa which is larger than the complex elastic modulus E*1 of the main body, and a sulfur content of at least 1.0 phr.

4. The method of claim 3, wherein the rubber strips have a width of 5 to 30 mm and a thickness of 0.5 to 3.0 mm.

5. The method according to claim 3, wherein each of the main body and the inner layer portion is formed by spirally winding the rubber strip in the direction toward the axially outer side starting from the axially inner side.

* * * * *